United States Patent
Elia et al.

(10) Patent No.: US 9,499,205 B1
(45) Date of Patent: Nov. 22, 2016

(54) HYBRID VEHICLE PACKAGING SYSTEM

(71) Applicant: FORD GLOBAL TECHNOLOGIES, LLC, Dearborn, MI (US)

(72) Inventors: Paul Elia, West Bloomfield, MI (US); Justin I. Thakolkaran, Royal Oak, MI (US); Corey John Jarocki, Harrison Township, MI (US); William Moore Sherwood, Royal Oak, MI (US); John Patrick Doyle, II, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/862,452

(22) Filed: Sep. 23, 2015

(51) Int. Cl.
  *B60K 37/00* (2006.01)
  *B62D 21/15* (2006.01)
  *B62D 21/16* (2006.01)
  *B60K 6/28* (2007.10)
  *B60K 1/04* (2006.01)
  *B60K 15/063* (2006.01)

(52) U.S. Cl.
  CPC ............. *B62D 21/15* (2013.01); *B60K 1/04* (2013.01); *B60K 6/28* (2013.01); *B60K 15/063* (2013.01); *B62D 21/16* (2013.01); *B60K 2001/0438* (2013.01); *B60K 2015/0634* (2013.01); *B60Y 2200/92* (2013.01); *B60Y 2400/104* (2013.01); *B60Y 2400/112* (2013.01); *Y10S 903/907* (2013.01); *Y10S 903/951* (2013.01)

(58) Field of Classification Search
  CPC B65H 2511/12; B65H 2220/04; B61D 3/12; B61L 1/188; H02M 3/07; B62J 35/00; B62K 11/04; B60K 1/04; B60K 15/067; B01D 35/0273
  USPC ............... 296/204; 123/456; 180/68.5, 69.4; 280/830, 834
  See application file for complete search history.

(56) References Cited

U.S. PATENT DOCUMENTS

| | | | | |
|---|---|---|---|---|
| 5,673,939 A | * | 10/1997 | Bees | B60K 1/04 280/831 |
| 6,076,858 A | * | 6/2000 | Funabashi | B60K 15/063 220/4.14 |
| 7,427,093 B2 | | 9/2008 | Watanabe et al. | |
| 7,614,473 B2 | * | 11/2009 | Ono | B60K 1/04 180/291 |
| 7,743,863 B2 | * | 6/2010 | Shindou | B60K 1/04 180/68.5 |
| 8,556,336 B2 | * | 10/2013 | Yasuhara | B62D 21/11 296/193.07 |
| 8,602,454 B1 | * | 12/2013 | Baccouche | B60K 1/04 180/68.5 |
| 8,827,023 B2 | | 9/2014 | Matsuda et al. | |
| 8,881,853 B2 | * | 11/2014 | Nitawaki | B60K 1/04 180/68.5 |

(Continued)

FOREIGN PATENT DOCUMENTS

| EP | 2468609 A2 | 6/2012 |
|---|---|---|
| JP | 2013107592 A | 6/2013 |

(Continued)

*Primary Examiner* — Kiran B Patel
(74) *Attorney, Agent, or Firm* — Jason Rogers; Brooks Kushman P.C.

(57) ABSTRACT

A vehicle includes a fuel tank, a battery, a first exoskeleton, and a second exoskeleton. The fuel tank and the battery straddle a driveline and are each disposed below a seating area. The first exoskeleton has a first pair of rails secured to each other by a first cross member. The second exoskeleton has a second pair of rails secured to each other by a second cross member. The first and second exoskeletons surround the fuel tank and battery, respectively, and are configured to absorb energy during an impact to protect the fuel tank and battery.

20 Claims, 3 Drawing Sheets

(56) References Cited

U.S. PATENT DOCUMENTS

| | | | | |
|---|---|---|---|---|
| 8,978,617 B2* | 3/2015 | Matsuda | ................. | F02B 77/00 123/198 E |
| 9,211,917 B1* | 12/2015 | Baccouche | ........ | B62D 25/2027 |
| 2003/0037987 A1* | 2/2003 | Chernoff | .................. | B60G 3/18 180/402 |
| 2004/0245033 A1* | 12/2004 | Saeki | ..................... | B62D 39/00 180/89.1 |
| 2008/0000703 A1* | 1/2008 | Shindou | .................. | B60K 1/04 180/68.5 |
| 2010/0052351 A1* | 3/2010 | Sartin | ..................... | B60P 1/431 296/20 |
| 2010/0114762 A1* | 5/2010 | Ishii | .................. | B60L 11/1803 705/40 |
| 2011/0132676 A1* | 6/2011 | Kodaira | .................. | B60K 1/04 180/65.51 |
| 2011/0168468 A1* | 7/2011 | Taguchi | .................. | B60K 1/02 180/65.245 |
| 2012/0090907 A1* | 4/2012 | Storc | ........................ | B60K 1/04 180/68.5 |
| 2012/0212009 A1* | 8/2012 | Ishizono | .............. | B62D 25/025 296/193.07 |
| 2012/0255799 A1* | 10/2012 | Kohler | .................. | B60L 11/126 180/65.245 |
| 2012/0312610 A1* | 12/2012 | Kim | .................... | H01M 2/1077 180/65.31 |
| 2013/0175829 A1* | 7/2013 | Kim | ........................ | B60K 1/04 296/204 |
| 2014/0079977 A1* | 3/2014 | Tsujimura | ........... | H01M 2/1077 429/120 |
| 2014/0103627 A1* | 4/2014 | Deckard | .................. | F16B 7/18 280/807 |
| 2015/0343900 A1* | 12/2015 | Schlangen | ............... | B60G 3/20 180/247 |
| 2016/0039462 A1* | 2/2016 | Kempf | .................. | B62D 25/20 296/204 |
| 2016/0226041 A1* | 8/2016 | Jackson | .............. | H01M 2/1083 |

FOREIGN PATENT DOCUMENTS

| | | |
|---|---|---|
| JP | 2014019260 A | 2/2014 |
| JP | 5459511 B2 | 4/2014 |

* cited by examiner

HYBRID VEHICLE PACKAGING SYSTEM

TECHNICAL FIELD

The present disclosure relates to hybrid vehicles and packaging of components for hybrid vehicles.

BACKGROUND

Packaging solutions for hybrid vehicle batteries often include constraining the size of the battery to increase the volume for cargo space and the fuel tank. This constraint in battery size corresponds to decreases in the range the vehicle may operate in an EV mode and the overall driving range of the vehicle.

SUMMARY

A vehicle includes a fuel tank, a battery, a first exoskeleton, and a second exoskeleton. The fuel tank and the battery straddle a driveline and are each disposed below a seating area. The first exoskeleton has a first pair of rails secured to each other by a first cross member. The second exoskeleton has a second pair of rails secured to each other by a second cross member. The first and second exoskeletons surround the fuel tank and battery, respectively, and are configured to absorb energy during an impact to protect the fuel tank and battery.

A vehicle includes a driveline, a cabin floor, a fuel tank, a battery, and a frame. The fuel tank and battery straddle the driveline and are each disposed below the floor. The frame has a first pair of rails extending along a direction of the driveline. Each of the first pair of rails is disposed on opposing sides of the fuel tank from the other. A first cross member spans the first pair of rails such that the first pair of rails and the first cross member form a first cage that surrounds the fuel tank and absorbs energy during an impact event, in order to protect the fuel tank. The frame also has a second pair of rails extending along the direction of the driveline. Each of the second pair of rails is disposed on opposing sides of the battery from the other. A second cross member spans the second pair of rails such that the second pair of rails and the second cross member form a second cage that surrounds the battery and absorbs energy during an impact event, in order to protect the battery.

A vehicle includes a pair of rails defining a driveshaft routing tunnel, a fuel tank, a battery, a first side rail, a first cross member, a second side rail, and a second cross member. The fuel tank and the battery are disposed on opposing sides of the pair of rails and below a cabin floor of the vehicle. The first side rail is disposed adjacent to the fuel tank opposite of a first of the pair of rails. The first cross member abridges the first of the pair of rails and the first side rail to form a first cage that surrounds the fuel tank configured to absorb energy during an impact event in order protect the fuel tank. The second side rail is disposed adjacent to the battery opposite of a second of the pair of rails. The second cross member abridges the second of the pair of rails and the second side rail to form a second cage that surrounds the battery configured to absorb energy during an impact event in order to protect the battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As hybrid vehicle technology expands into to rear wheel drive trucks and sport utility vehicles there is an increased demand for packaging and architectural solutions for protecting the high-capacity battery packs that are used provide power to the traction motor in order to propel the vehicle. One possible solution includes packaging the high-voltage battery alongside the fuel tank underneath the cabin floor of the vehicle. An advantage of this packaging configuration is that it allows for sharing a common underbody architecture between vehicles that are propelled by combustion engines alone and hybrid vehicles that are propelled by combustion engines and electric machines. Other components of the vehicle, such as the driveshaft and exhaust system, may be routed through the center of the vehicle. In this configuration, hybrid vehicles may include larger batteries without sacrificing cargo space or fuel capacity.

Figure 1:
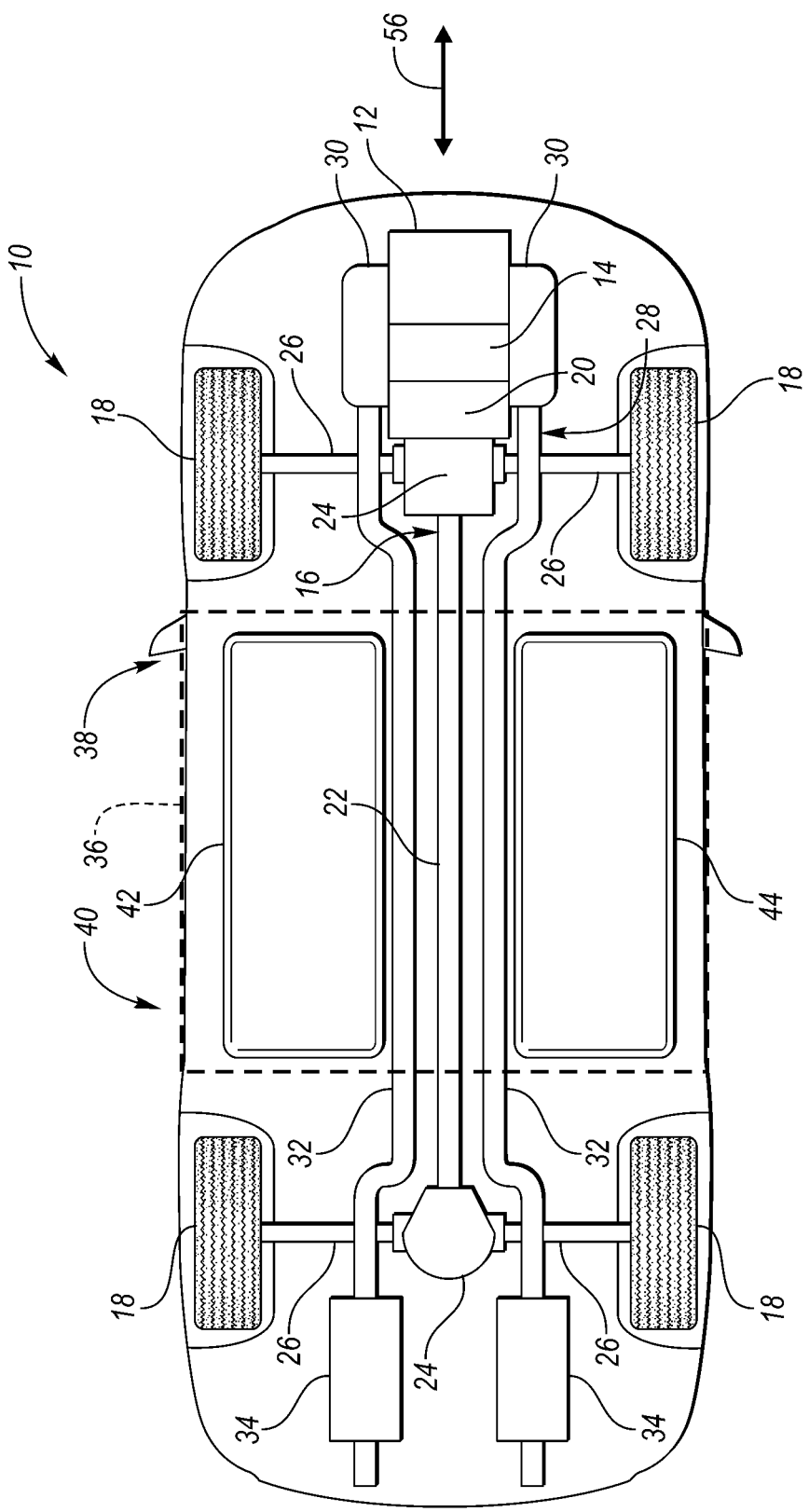
FIG. 1 is a plan view of a vehicle underbody.

Referring to FIG. 1, and underbody of a vehicle 10 is illustrated. The vehicle 10 may include one or more power sources, such as an engine 12 and an electric machine 14. The electrical machine 14 may be electric motor or a combination electric motor/generator. The engine 12 and electric machine 14 may be connected to a driveline 16 that is configured to deliver motive power from the engine 12 and electric machine 14 to the wheels 18 of the vehicle 10. The driveline 16 may comprise a series of driveshafts, differentials, half shafts, gearboxes, or any other component that is typically found in the driveline vehicle. An exemplary embodiment of the driveline 16 includes the transmission gearbox 20, a main driveshaft 22, differentials 24, and a series of half shafts 26. A launch clutch or torque converter may be disposed between the transmission gearbox 20 and the power sources (i.e., the engine 12 and electric machine 14).

The vehicle 10 may further include an exhaust system 28 that includes at least one exhaust manifold 30, exhaust piping 32, and at least one muffler 34. The exhaust system 28 is configured to route the exhaust that is generated in the engine during fuel combustion away from the vehicle. The exhaust system 28 is also configured to muffle any noise that is generated from the engine during fuel combustion.

The vehicle 10 may include a frame the defines a tunnel (discussed below) for routing a portion of the exhaust system 28, such as the exhaust piping 32, and for routing a portion of the driveline 16, such as the main driveshaft 22. The exhaust piping 32 and main driveshaft 22 may be routed through the center of the vehicle 10 via the tunnel.

The vehicle 10 may also include a seating area 36. The seating area 36 comprises the occupancy area within a cabin of the vehicle 10 that includes the vehicle seats, instrument controls, steering wheel, brake pedal, accelerator pedal, etc. The seating area 36 may define the footprint of the cabin floor. The seating area 36 may include a front seating portion 38 and a rear sitting portion 40.

A fuel tank 42 and a battery 44 (that may be used to deliver power to the electric machine 14 in order to propel the vehicle 10) may be disposed on opposing sides of the tunnel, the driveline 16 (or more specifically, the main driveshaft 22), and/or the exhaust system 28 (or more specifically, the exhaust piping 32). Stated differently, the fuel tank 42 and battery 44 may straddle the tunnel, the driveline 16, and/or the exhaust system 28. Additionally, the fuel tank 42 and battery 44 may be disposed below the seating area 36 (or below the cabin floor). More specifically, the fuel tank 42 and battery 44 may be disposed below the front seating portion 38 of the seating area 36 (or below a front portion of the cabin floor).

Figure 2:
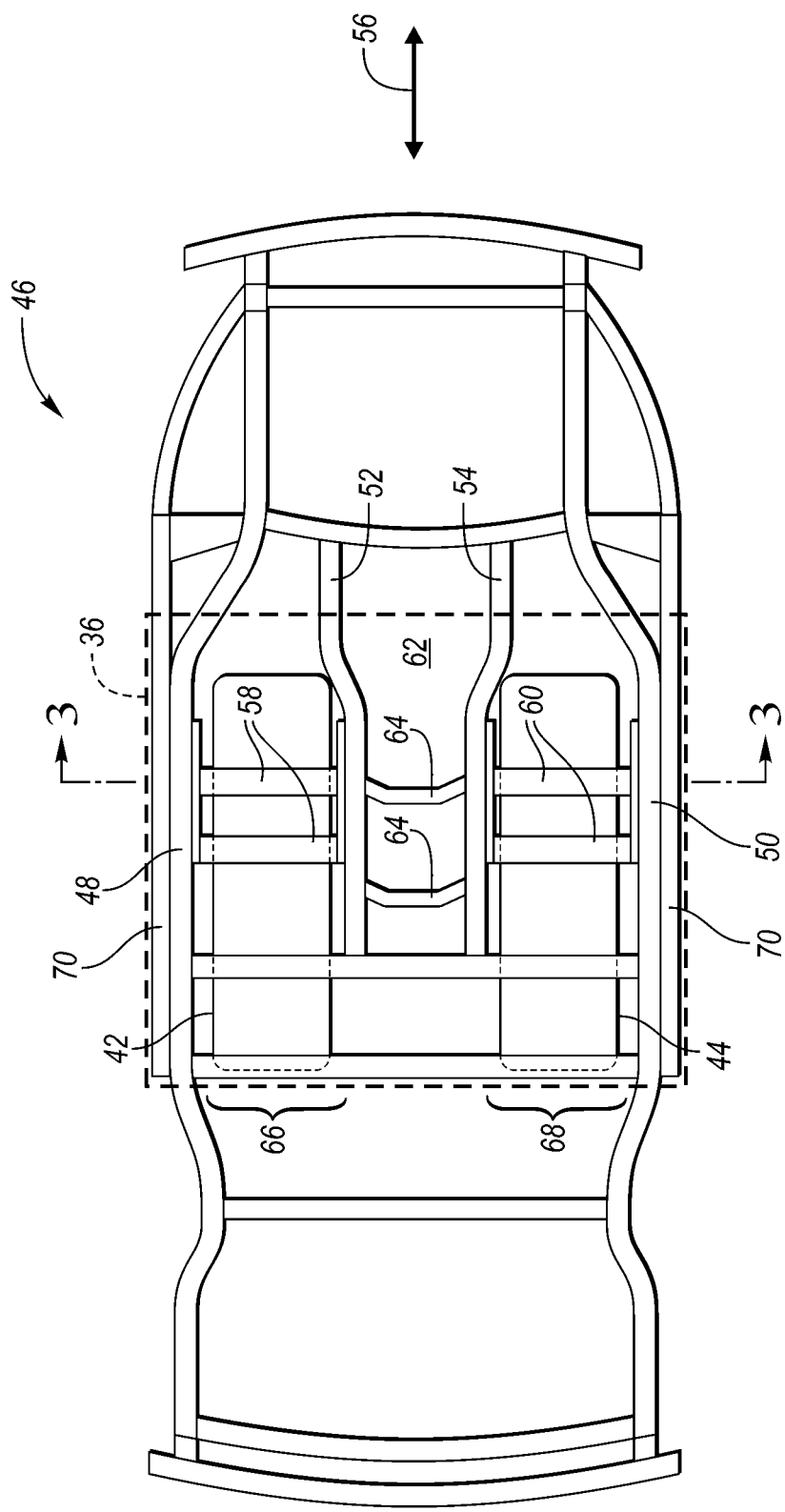
FIG. 2 is a plan view of a frame of the vehicle.
Figure 3:
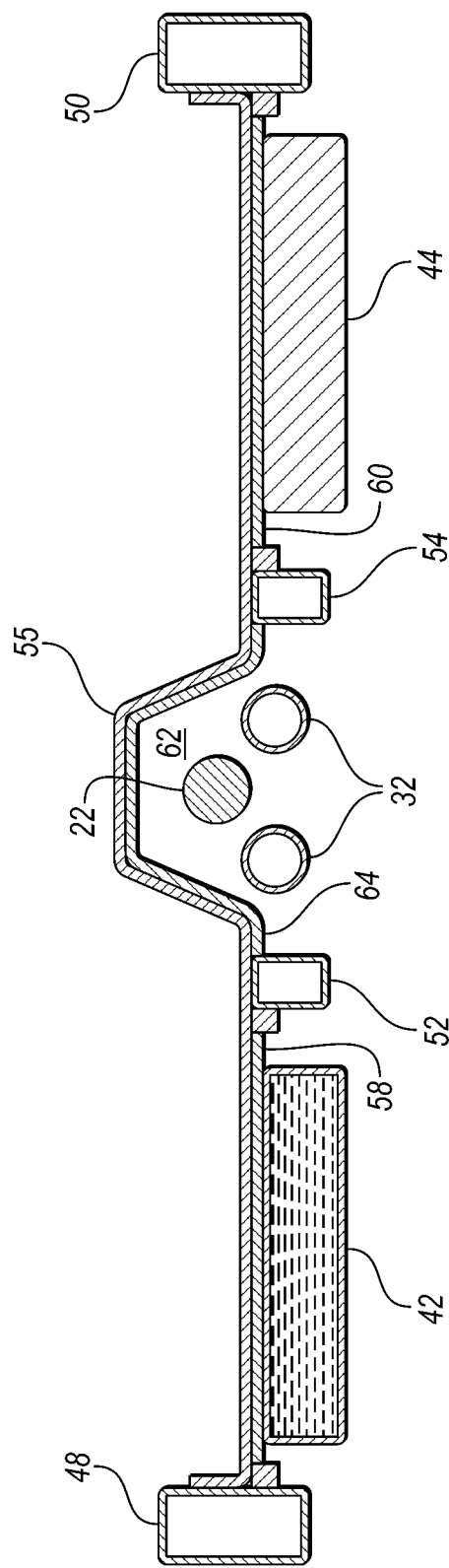
FIG. 3 is a cross sectional view taken along line 3-3 in FIG. 2.

Referring to FIGS. 2 and 3 a plan view and a cross sectional of a frame 46 of the vehicle 10 are illustrated, respectively. FIGS. 2 and 3 also demonstrate the relative locations of the fuel tank 42 and the battery 44 with respect to the frame 46. The frame 46 includes a first rail 48, a second rail 50, a third rail 52, and a fourth rail 54. The first rail 48, second rail 50, third rail 52, and fourth rail 54 may extend along a direction 56 of the driveline 16 (or main driveshaft 22). The first rail 48 and second rail 50 may also be referred to as first and second outer rails, a pair of outer rails, first and second side rails, or a pair of side rails. The third rail 52 and fourth rail 54 may also be referred to as first and second inner rails or a pair of inner rails. The various components of the frame (i.e., first rail 48, second rail 50, third rail 52, fourth rail 54, etc.) may be secured to and provide support for the cabin floor (or for pan) 55.

The first rail 48 and third rail 52 may comprise a first pair of rails that are each disposed on opposing sides of the fuel tank 42 from the other. A first set of cross members 58 may span (or abridge) the first rail 48 and the third rail 52 in order to secure the first rail 48 to the third rail 52. The first set of cross members 58 may be a portion of an H-frame that spans the first rail 48 and third rail 52 to provide additional support for the seating portion 36 (or a specific seat) of the vehicle 10. The first rail 48, third rail 52, and first of cross members 58 may form a first cage (or exoskeleton) that surrounds the fuel tank 42 in order to provide protection to the fuel tank 42 during an impact event. The first cage formed by the first rail 48, third rail 52, and first set of cross members 58 may be configured to absorb energy and prevent intrusions during an impact event in order to shield and protect the fuel tank 42 from any damage that may occur during the impact event.

The second rail 50 and fourth rail 54 may comprise a second pair of rails that are each disposed on opposing sides of the battery 44 from the other. A second set of cross members 60 may span (or abridge) the second rail 50 and fourth rail 54 in order to secure the second rail 50 to the fourth rail 54. The second set of cross members 60 may be a portion of an H-frame that spans the second rail 50 and fourth rail 54 to provide additional support for the seating portion 36 (or a specific seat) of the vehicle 10. The second rail 50, fourth rail 54, and second set of cross members 60 may form a second cage (or exoskeleton) that surrounds the battery 44 in order to provide protection to the battery 44 during an impact event. The second cage formed by the second rail 50, fourth rail 54, and second set of cross members 60 may be configured to absorb energy and prevent intrusions during an impact event in order to shield and protect the battery 44 from any damage that may occur during the impact event.

The third rail 52 and fourth rail 54 may define a tunnel 62 that is utilized for routing the main driveshaft 22 and/or the exhaust piping 32. The third rail 52 and fourth rail 54 may be disposed on opposing sides of the tunnel 62. The fuel tank 42 and battery 44 may be disposed on opposing sides of the pair of rails comprising the third rail 52 and fourth rail 54. The first rail 48 is disposed adjacent to the fuel tank 42 on an opposite side of the fuel tank 42 relative to the third rail 52. The second rail 50 is disposed adjacent to the battery 44 on an opposite side of the battery 44 relative to the fourth rail 54. A reinforcement member 64 may span the tunnel 62 and secure the third rail 52 to the fourth rail 54. The reinforcement member 64 may also provide additional support and strength to the frame 46 in order to protect the fuel tank 42 and battery 44 from damage that may occur during an impact event.

The first rail 48 may splay outward while the third rail 52 splays inward, relative to the main driveshaft 22 and tunnel 62, to define a receiving area 66 (or space) for the fuel tank 42. The second rail 50 may splay outward while the fourth rail 54 splays inward, relative to the main driveshaft 22 and tunnel 62, to define a receiving area 68 (or space) for the battery 44. By splaying the rails either inward or outward, the receiving area 66 for the fuel tank 42 and the receiving area 68 for the battery 44 may be increased. The increase in the receiving areas for the fuel tank 42 and the battery 44 may also allow for an increase in the sizes of both the fuel tank 42 and the battery 44, which in turn would result in an increase in the travel range of the vehicle 10.

The frame 46 may also include reinforcement rocker members 70 (shown in FIG. 2, but not FIG. 3). In the exemplary embodiment, a reinforcement rocker 70 is secured to each of the first rail 48 and the second rail 50. The reinforcement rocker members 70 may increase the overall robustness of the frame 46 and therefore increase the overall energy absorbing capability of the frame 46 during impact events to further protect the fuel tank 42 and battery 44 during impact events.

It should be understood that the hybrid vehicle configuration in FIG. 1 is merely exemplary and is not intended to be limited. The schematics of FIGS. 1-3 may be applicable to non-hybrid, electric, and other hybrid vehicle configurations, which should be construed as disclosed herein. Other hybrid and electric vehicle configurations that should be construed as disclosed herein include series hybrid vehicles, parallel hybrid vehicles, series-parallel hybrid vehicles, power-split hybrid vehicles, plug-in hybrid electric vehicles (PHEVs), fuel cell hybrid vehicles, battery operated electric vehicles (BEVs), or any other hybrid or electric vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a fuel tank and a battery straddling a driveline and disposed below a seating area;
   a first exoskeleton having a first pair of rails secured to each other by a first cross member; and
   a second exoskeleton having a second pair of rails secured to each other by a second cross member, wherein the first and second exoskeletons surround the fuel tank and battery, respectively, and are configured to absorb impact energy.

2. The vehicle of claim 1, wherein a first of the first pair of rails and a first of the second pair of rails define a tunnel for routing a driveshaft that comprises a portion of the driveline.

3. The vehicle of claim 2, wherein the rails that define the tunnel are secured to each other by a reinforcement member that spans the tunnel.

4. The vehicle of claim 3, wherein a second of the first pair of rails and a second of the second pair of rails are disposed on opposing sides of the first of the first pair of rails and the first of the second pair of rails, respectively, relative to the driveline, and wherein the second of the first pair of rails and the second of the second pair of rails splay outward, relative to the driveline, defining receiving areas for the fuel tank and battery.

5. The vehicle of claim 4, wherein the first of the first pair of rails and the first of the second pair of rails splay inward, relative to the driveline, further defining the receiving areas for the fuel tank and battery.

6. The vehicle of claim 1, further comprising reinforcement rocker members secured to the second of the first pair of rails and the second of the second pair of rails, wherein the reinforcement rockers are configured to absorb impact energy.

7. A vehicle comprising:
   a driveline;
   a cabin floor;
   a fuel tank and a battery straddling the driveline and disposed below the floor; and
   a frame having,
      a first pair of rails extending along a direction of the driveline, each of the first pair of rails disposed on opposing sides of the fuel tank from the other,
      a first cross member spanning the first pair of rails such that the first pair of rails and the first cross member form a first cage that surrounds the fuel tank and absorbs energy during an impact event,
      a second pair of rails extending along the direction of the driveline, each of the second pair of rails disposed on opposing sides of the battery from the other, and
      a second cross member spanning the second pair of rails such that the second pair of rails and the second cross member form a second cage that surrounds the battery and absorbs energy during an impact event.

8. The vehicle of claim 7, wherein a first of the first pair of rails and a first of the second pair of rails define a tunnel for routing a driveshaft that comprises a portion of the driveline.

9. The vehicle of claim 8, wherein the frame further comprises a reinforcement member that spans the tunnel, and wherein the rails that define the tunnel are secured to each other by the reinforcement member.

10. The vehicle of claim 8, wherein a second of the first pair of rails and a second of the second pair of rails are disposed on opposing sides of the first of the first pair of rails and the first of the second pair of rails, respectively, relative to the driveline, and wherein the second of the first pair of rails and the second of the second pair of rails splay outward, relative to the driveline, defining receiving areas for the fuel tank and battery.

11. The vehicle of claim 10, wherein the first of the first pair of rails and the first of the second pair of rails splay inward, relative to the driveline, further defining the receiving areas for the fuel tank and battery.

12. The vehicle of claim 7, wherein the fuel tank and the battery are disposed below a front seating portion of the cabin floor.

13. The vehicle of claim 7, wherein the frame further comprises reinforcement rocker members secured to the second of the first pair of rails and the second of the second pair of rails, wherein the reinforcement rockers are configured to absorb energy during an impact event.

14. A vehicle comprising:
   a pair of rails defining a driveshaft routing tunnel;
   a fuel tank and a battery disposed on opposing sides of the pair of rails and below a cabin floor;
   a first side rail disposed adjacent to the fuel tank opposite of a first of the pair of rails;
   a first cross member abridging the first of the pair of rails and the first side rail to form a first cage that surrounds the fuel tank configured to absorb energy during an impact event;
   a second side rail disposed adjacent to the battery opposite of a second of the pair of rails; and
   a second cross member abridging the second of the pair of rails and the second side rail to form a second cage that surrounds the battery configured to absorb energy during an impact event.

15. The vehicle of claim 14, further comprising a reinforcement member spanning the tunnel and securing the pair of rails to each other.

16. The vehicle of claim 14, wherein the fuel tank is disposed below a front seating portion of the cabin floor.

17. The vehicle of claim 16, wherein the battery is disposed below the front seating portion of the cabin floor.

18. The vehicle of claim 14, wherein the first and second side rails splay outward, relative to the driveshaft routing tunnel, defining areas for receiving the fuel tank and battery.

19. The vehicle of claim 18, wherein each of the pair of inner rails splay inward, relative to the driveshaft routing tunnel, further defining the areas for receiving the fuel tank and battery.

20. The vehicle of claim 14, further comprising reinforcement rocker members secured to the first and second side rails, wherein the reinforcement rockers are configured to absorb energy during an impact event.

* * * * *